J. SLEPIAN.
ELECTROLYTIC CONDENSER.
APPLICATION FILED DEC. 30, 1919.
1,395,305.
Patented Nov. 1, 1921.
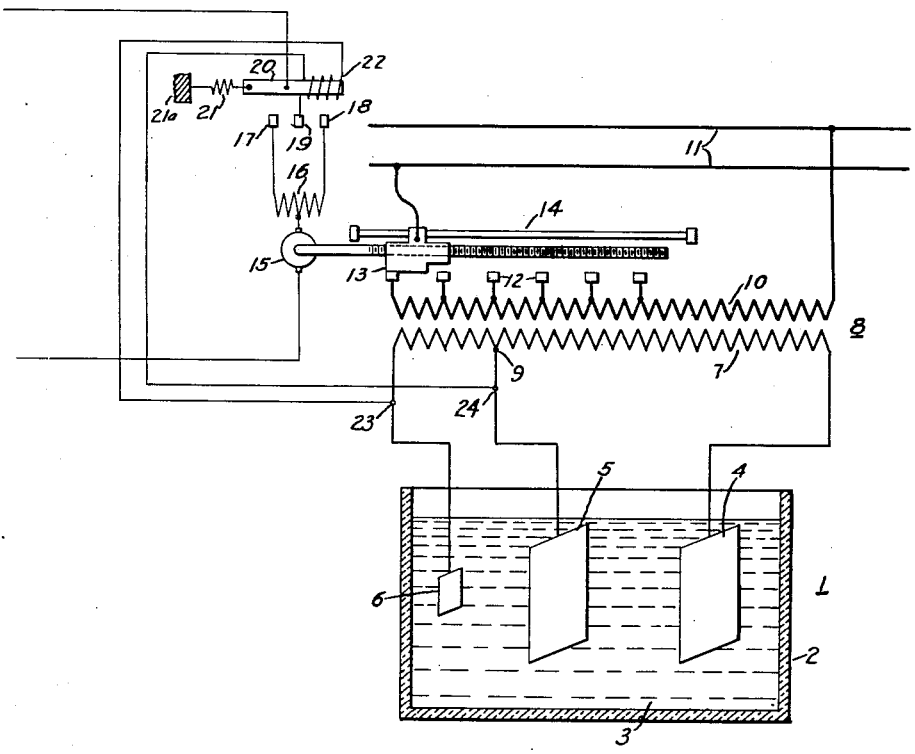
WITNESSES:
INVENTOR
Joseph Slepian
BY
ATTORNEY

UNITED STATES PATENT OFFICE.

JOSEPH SLEPIAN, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTROLYTIC CONDENSER.

1,395,305.      Specification of Letters Patent.      Patented Nov. 1, 1921.

Application filed December 30, 1919. Serial No. 348,452.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrolytic Condensers, of which the following is a specification.

My invention relates to electrolytic condensers and, more particularly, to condensers of the type formed by employing a plurality of film-forming electrodes immersed in a suitable electrolyte and it has, for its primary object, the provision of means for constantly maintaining the condensers in good operating condition.

I have found that the best operating conditions obtain in electrolytic condensers when the impressed voltage is maintained constant. Since, however, in practice, such condensers are applied to circuits in which the voltage is variable, it is desirable to provide means for maintaining the impressed voltage on the condensers substantially constant. One object of my invention, therefore, resides in the provision of means for maintaining the voltage impressed upon a condenser, connected in a supply circuit, substantially constant.

A distinct advantage is obtained by my invention in the application of electrolytic condensers for power-factor regulation on alternating-current supply circuits. In such circuits, the amount of leading current to be supplied to maintain good voltage regulation varies in an inverse manner with the voltage of the alternating-current mains. By my invention, more leading current is supplied to the alternating-current mains at a low voltage and less leading current at a higher voltage.

A further object of my invention is the provision of apparatus which shall accomplish the above-described desirable features in a simple manner with apparatus which will not materially complicate the connections of an electrolytic condenser to a supply circuit.

With these and other objects in view, my invention will be more fully described and illustrated in the drawing, which is a diagram of an electrolytic condenser and additional electrical equipment by means of which the voltage impressed upon the condenser is maintained substantially constant.

In practising my invention, I prefer to employ a condenser construction comprising a suitable electrolyte and a plurality of main film-forming electrodes, together with an auxiliary film-forming electrode of less area than the main electrodes. It has been found that, if an auxiliary electrode of less area than the main electrodes is employed in a condenser and a higher alternating potential is impressed upon the auxiliary electrode, it tends to maintain the main electrodes always positive with respect to the electrolyte, which results in the main electrodes being maintained in good operating condition. The advantage obtained by employing the auxiliary electrode is offset, however, by the effects of a variable voltage being impressed upon the condenser, and my invention contemplates the employment of auxiliary apparatus to maintain the impressed voltage on the condenser substantially constant, thereby insuring substantially a constant capacitance.

The present application describes an invention which is closely related to those described in my copending applications, Serial Nos. 348,450 and 348,453, on electrolytic condensers, filed December 30, 1919.

In the drawing is shown a condenser 1 comprising a tank 2 containing a suitable electrolyte 3 in which a plurality of main film-forming electrodes 4 and 5 are immersed, together with an auxiliary film-forming electrode 6. The main electrode 4 is connected to one side of a secondary winding 7 of a transformer 8 and the other electrode 5 is connected to a tap 9 on the secondary winding 7, the auxiliary electrode 6 being connected to the other end of the secondary winding. A primary winding 10 of the transformer 8 is connected, at one side, to one of the alternating current supply mains 11 and is provided with a plurality of taps 12 that are adapted to be engaged by a movable contact member 13, which is connected, by a flexible lead, to the other supply main 11. The contact member 13 is mounted upon a feed screw and is adapted to be moved thereby along its supporting rod 14. A reversing motor 15 is connected to drive the feed screw and has a series-field winding 16 which is connected to one terminal of the armature at its mid-point and to a plurality of contact members 17 and 18 at its ends. The contact members 17 and 18 are adapted to be engaged by a movable contact member 19 which is mounted upon a core member 20, one end of the latter being connected, by a spring 21, to a stationary part 21ª and being actuated in opposition to the spring by a voltage coil 22 disposed about its other end. The voltage coil 22 is connected across a plurality of turns of the secondary winding 7, as indicated at 23 and 24, and is controlled, therefore, by the voltage per turn of said secondary winding. The core member 20 may be connected to a direct-current supply circuit, not shown, together with one terminal of the armature of the motor 15, thereby providing an exciting circuit for the motor.

It will be appreciated from the foregoing description that, when the voltage per turn in the secondary winding increases, the degree of excitation of the coil 22 will be increased which will cause the contact member 19 to engage the contact member 18 by actuating the core member 20 against the holding force of the spring 21. The above operation establishes a circuit through the motor 15 which will advance the contact member 13 along the feed screw and rod 14 in the direction desired to increase the number of turns in the primary winding, thereby reducing the voltage per turn in the secondary winding 7. The reverse of this operation will occur when the voltage per turn in the secondary winding is decreased because the spring 21 will then actuate the core member 20 against the reduced force exerted by the coil 22 and cause the contact member 19 to engage the contact member 17, thereby reversing the direction of rotation of the motor 15.

It will be appreciated from the foregoing description that any change of voltage that occurs in the secondary winding of the transformer, which is connected to the electrolytic condenser, will cause the regulating apparatus to either increase or reduce the number of turns of the primary winding, thereby restoring the voltage across the secondary winding to its original value. The apparatus shown in the drawing has been employed merely to illustrate my invention and it may be largely modified to accomplish the desired results. My invention is not restricted to any particular form of apparatus but broadly comprehends the maintenance of constant impressed-voltage conditions on an electrolytic condenser connected in an alternating-current supply circuit. A condenser, operated as above described, will have a substantially constant capacitance, a low power factor and a relatively long life.

Although I have shown and specifically described a condenser provided with special apparatus for maintaining the impressed voltage substantially constant, it is obvious that changes may be made in the type of apparatus employed without departing from the spirit or scope of my invention and I desire, therefore, that no limitations shall be imposed except as indicated in the appended claims.

I claim as my invention:

1. The method of maintaining a substantially constant capacitance in an electrolytic condenser that comprises providing means for regulating the impressed voltage on the condenser, and maintaining the impressed voltage substantially constant.

2. The method of maintaining a substantially constant capacitance in an electrolytic condenser that comprises connecting the condenser to an electrical supply circuit, providing means for automatically regulating the impressed voltage on the condenser and maintaining the impressed voltage substantially constant.

3. The method of maintaining the capacitance of an electrolytic condenser substantially constant that comprises connecting the condenser to a transformer, providing means for regulating the voltage of the transformer, and maintaining the voltage of the transformer substantially constant.

4. The method of maintaining the capacitance of an electrolytic condenser substantially constant that comprises connecting the condenser to the secondary winding of a transformer, the primary of which is connected to an alternating-current supply circuit, providing means for regulating the voltage of the transformer and maintaining the voltage across the secondary winding substantially constant.

5. The combination with an electrolytic condenser comprising a plurality of electrodes immersed in a suitable electrolyte and connected to an alternating-current supply circuit, of means for maintaining the voltage impressed on the electrodes substantially constant.

6. The combination with an electrolytic condenser connected to an alternating-current supply circuit and comprising a plurality of main electrodes, and an auxiliary electrode all immersed in an electrolyte, of means for maintaining the voltage impressed upon all of the electrodes substantially constant, and means for impressing a higher voltage upon the auxiliary electrode than upon the main electrodes.

7. The combination with a transformer connected to an alternating-current supply circuit, and an electrolytic condenser comprising a plurality of electrodes immersed in a suitable electrolyte and connected to the transformer, of means for maintaining the secondary voltage of the transformer substantially constant, said means including means for varying the number of turns of the primary winding included in the primary circuit.

In testimony whereof, I have hereunto subscribed my name this 29th day of December, 1919.

JOSEPH SLEPIAN.